(12) United States Patent
Smalley et al.

(10) Patent No.: US 11,548,693 B2
(45) Date of Patent: Jan. 10, 2023

(54) DISPENSING SYSTEM INCLUDING A BAFFLED FLOW REGULATOR

(71) Applicant: Silgan Dispensing Systems Corporation, Grandview, MO (US)

(72) Inventors: Leah Smalley, Leawood, KS (US); Jeroen de Regt, Oss (NL)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 17/439,835

(22) PCT Filed: Mar. 13, 2020

(86) PCT No.: PCT/US2020/022533
§ 371 (c)(1),
(2) Date: Sep. 16, 2021

(87) PCT Pub. No.: WO2020/190675
PCT Pub. Date: Sep. 24, 2020

(65) Prior Publication Data
US 2022/0185549 A1 Jun. 16, 2022

Related U.S. Application Data

(60) Provisional application No. 62/819,764, filed on Mar. 18, 2019.

(51) Int. Cl.
*B65D 47/04* (2006.01)
*B65D 47/32* (2006.01)
(Continued)

(52) U.S. Cl.
CPC .......... *B65D 47/043* (2013.01); *B65D 47/32* (2013.01); *G01F 11/265* (2013.01); *G01F 13/006* (2013.01)

(58) Field of Classification Search
CPC ..... B65D 47/043; B65D 47/32; G01F 11/265; G01F 13/006
(Continued)

(56) References Cited

U.S. PATENT DOCUMENTS 3,321,113 A 5/1967 Conry
3,322,145 A 5/1967 Prosser
(Continued)

FOREIGN PATENT DOCUMENTS

| CA | 2355207 A1 | 7/2000 |
| DE | 10327335 A1 | 11/2004 |
| WO | 2018147946 A1 | 8/2018 |

OTHER PUBLICATIONS

EP20772600.1, Extended European Search Report, dated Apr. 28, 2022.

*Primary Examiner* — Paul R Durand
*Assistant Examiner* — Michael J. Melaragno
(74) *Attorney, Agent, or Firm* — Barlow Josephs and Holmes

(57) ABSTRACT

A dispensing system (100) includes a pour cap (102) which may be connected with the neck of a container (900). The cap base includes a main deck (108), a dispensing spout (110) and a venting tube (112). A flow regulator is mounted on the underside of the main deck such that the flow regulator restricts flow through the opening of the dispensing spout. In some embodiments, the flow regulator is a hinged spring-loaded baffle plate (116). In some embodiments, the flow regulator is a gravity ball valve (316). A visual timing device (200) may be advantageously located on the pour cap (102) so that the timing device is easily visible to a user during operation or use of the dispensing system. The constant flow rate provided by the flow regu-
(Continued)

lator allows the timing device to more precisely measure each pour regardless of how much fluid is in the bottle.

16 Claims, 10 Drawing Sheets

(51) Int. Cl.
*G01F 11/26* (2006.01)
*G01F 13/00* (2006.01)

(58) Field of Classification Search
USPC .......................................................... 222/71
See application file for complete search history.

(56) References Cited

U.S. PATENT DOCUMENTS

| | | |
|---|---|---|
| RE31,434 E | 11/1983 | Reilly |
| 11,054,294 B1 * | 7/2021 | Smalley ............... H04M 1/0264 |
| 11,099,044 B1 * | 8/2021 | Smalley ................ G01F 13/006 |
| 2015/0251822 A1 | 9/2015 | Slevin et al. |

* cited by examiner

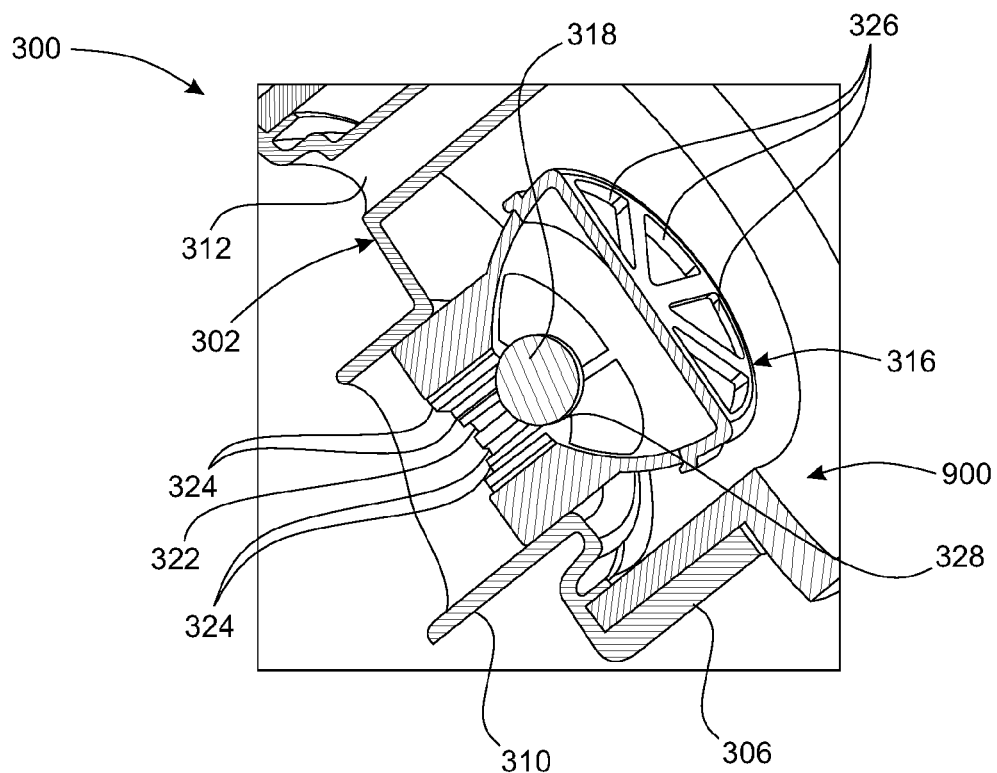
FIG. 9
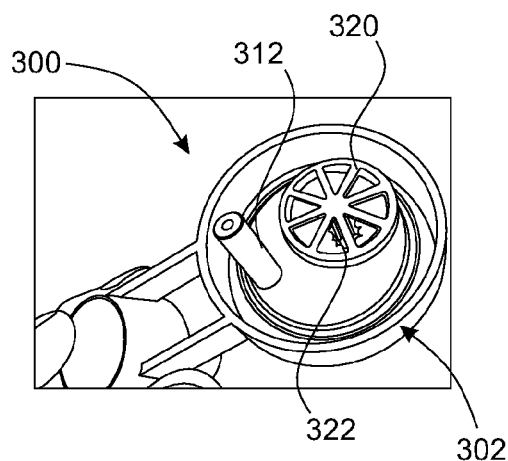 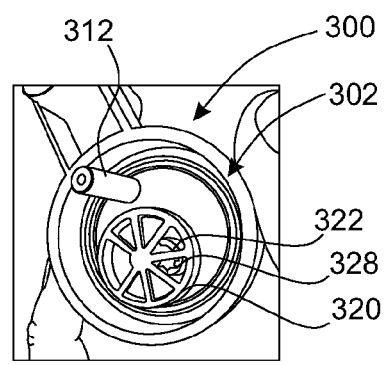
FIG. 10A　　　　　　　　FIG. 10B

DISPENSING SYSTEM INCLUDING A BAFFLED FLOW REGULATOR

BACKGROUND OF THE DISCLOSURE

Field of the Invention

The present invention relates to dispensing systems and closures.

State of the Art

Dispensing devices are used to dispense a various number of products. Typically, a dispensing device, such as a pump, closure, trigger sprayer, or other device is attached to a container or bottle containing a product to be dispensed. The dispensing device facilitates the dispensing of the product from the container or bottle.

In many instances, a user desires to measure the amount of product being dispensed from a container through the dispensing device. For example, in many laundry care applications, a dispensing device may include a cap that acts as a cup, having graduated markings in the cap so that a user may measure out a desired amount of product into the cap before pouring the product into an intended location. While such systems allow estimated measurements, many users complain about the additional mess associated with using the cap in such a manner and prefer a one-handed operation allowing them to pour or dispense a product directly into the desired location.

SUMMARY OF THE DISCLOSURE

A dispenser device having a flow regulator located within the dispensing spout is disclosed. The flow regulator may be used in conjunction with a visible timing feature to provide a more consistent flow and a more accurate dispensed volume during a timed dispensing period.

According to various embodiments of the invention, a dispensing system may include a container and a pour cap. The pour cap may include a cap base which may be connected to or mated with the container in various ways. The cap base includes a main deck and a dispensing spout extending upwardly therefrom. A venting tube may be located within the main deck adjacent a rear portion of the dispensing spout opening and extending downwardly from the main deck into the interior of the cap base.

A flow regulator comprising a hinged, spring-loaded baffle plate is mounted on the underside of the main deck such that the baffle plate hinges over the opening of the dispensing spout to regulate flow. A hinge mechanism connects the baffle plate to the underside of the main deck and is located adjacent the rear portion of the dispensing spout. A spring is captured between the underside of the main deck and an upper surface of the baffle plate adjacent the front portion of the dispensing spout. As fluid from the container is poured, the fluid in the container contacts the flat baffle plate (see arrows). Head pressure from the fluid acts on the hinged baffle plate compressing the spring and partially closing the dispensing passage. When the bottle is full, there is more head pressure, and the baffle closes off more of the flow passage to regulate flow. As the bottle empties, there is less fluid and less head pressure, opening the dispensing passage slightly more with fluid flow thus providing a constant flow rate.

A visual timing device may be advantageously located on the pour cap so that the timing device is easily visible to a user during operation or use of the dispensing system. The visual timing device may include a transparent or translucent outer cylinder which may be filled with a fluid or other product that may flow within the timing device to visually represent or correspond to a given amount of product being dispensed from the dispensing device. The timing device may include flow channels which may be modified for a particular use such that the visible flow of the fluid or flowable material in the timing device may be used to measure the output of the dispensing device. The constant flow rate provided by the baffle allows the timing device to more precisely measure each pour regardless of how much fluid is in the bottle. The result is far more accurate than a free pour with no baffle.

According to other embodiments of the invention, the flow regulator comprises a gravity ball valve which also acts to provide a constant flow rate from the pour spout. Coupled with a timing device, the gravity ball valve also provides a more precisely measured pour regardless of how much fluid is in the container.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

FIG. 9 is an enlarged cross-sectional view of the dispensing spout;

FIGS. 10A-10B are perspective views thereof; and

DETAILED DESCRIPTION OF THE EXEMPLARY EMBODIMENTS

Figure 1:
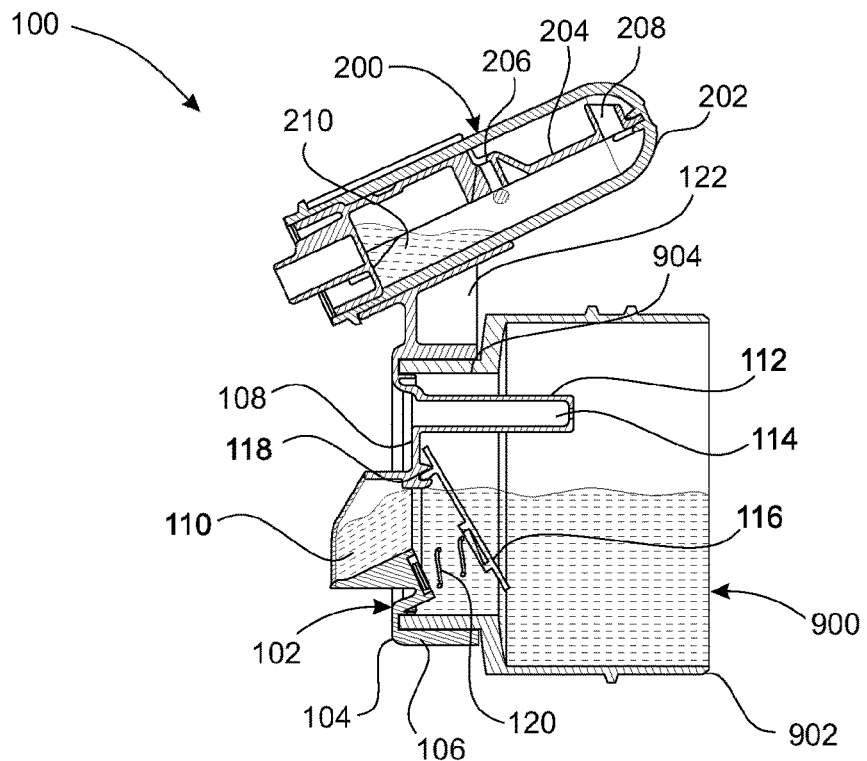
FIG. 1 is a cross-sectional view of an exemplary dispensing system including a baffle plate according to various embodiments of the invention.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

An exemplary dispensing system 10 according to various embodiments of the invention is illustrated in FIGS. 1-5. The dispensing system 100 may include a container 900 and a pour cap 102.

The container 900 may include a body 902 and a neck 904.

According to various embodiments of the invention, the pour cap 102 may include a cap base 104 which may be connected to or mated with the container 900 in various ways. For instance, the cap base 104 may include a skirt 106 having threads, bayonet features, snap features, or other features allowing the pour cap to be connected to the neck of the container 900 having similar features.

In some embodiments, the system 100 may further include a closure lid (not shown) connected to the cap base, for example, by a living hinge or other hinge system.

The cap base 104 includes a main deck 108 and a dispensing spout 110 extending upwardly therefrom. A venting tube 112 may be located within the main deck 108 and may further be located adjacent a rear portion of the dispensing spout 110. The venting tube 112 extends downwardly from the main deck 108 into the interior of the cap base 104. In other embodiments, the venting tube 112 may be located at other locations depending on the configuration of the cap base 104 and the size and orientation of the dispensing spout 110. A venting orifice 114 is located at the bottom terminal end of the venting tube 112. The venting orifice 114 may be provided by integrally molding the orifice or other means for capping the terminal end of the vent tube 112. The upper end of the venting tube 112 is preferably disposed below the undercut of the spout lip. The length of the venting tube 112 and the size of the venting orifice 114 may be adjusted to determine the venting performance of the dispensing system based on liquids with different viscosities.

Figure 2:
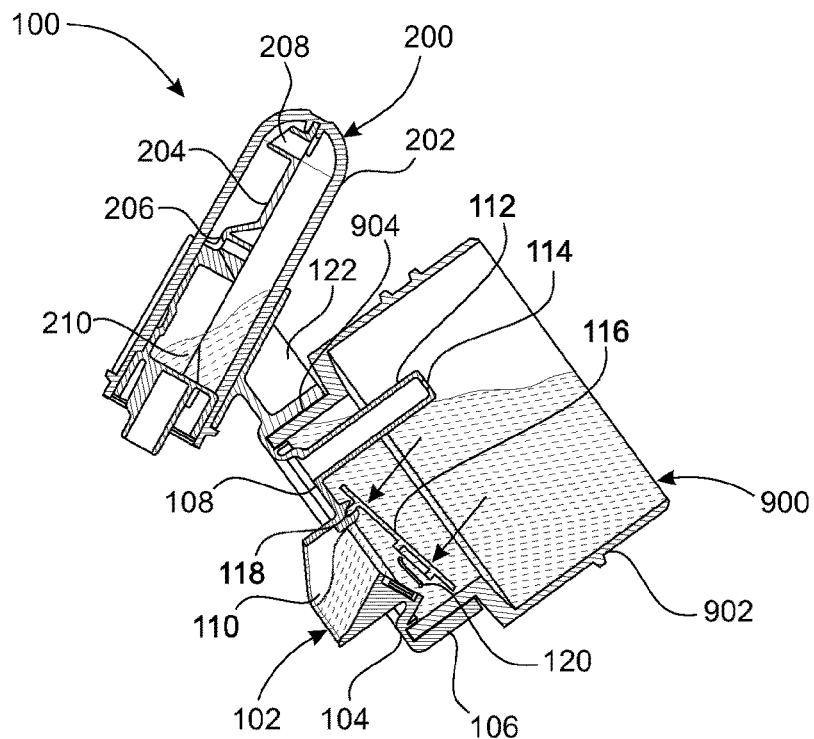
FIG. 2 is another cross-sectional view thereof.
Figure 3:
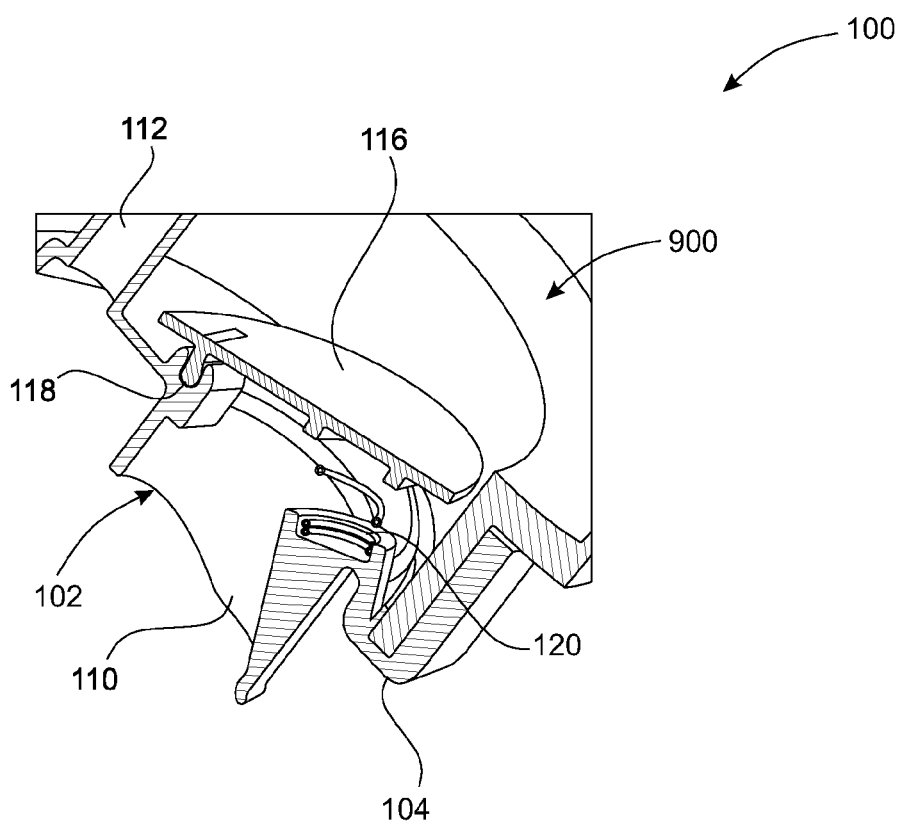
FIG. 3 is an enlarged cross-sectional view of the dispensing spout.
Figure 4:
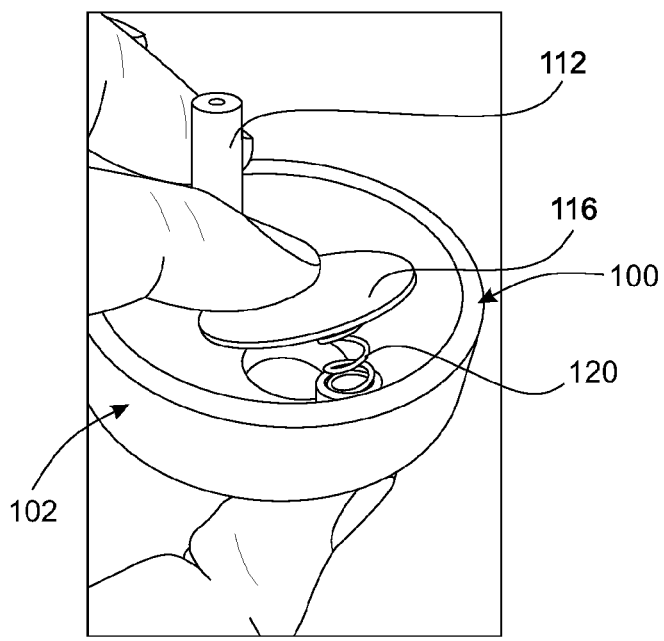
FIG. 4 is a perspective view thereof.

A flow regulator comprising a hinged, spring-loaded baffle plate 116 is mounted on the underside of the main deck 108 such that the baffle plate 116 hinges over the opening of the dispensing spout 110. A pin and sleeve hinge mechanism 118 connects the baffle plate 116 to the underside of the main deck 108 and is located adjacent the rear portion of the dispensing spout 110. A spring 120 is captured between the underside of the main deck 108 and an upper surface of the baffle plate 116 adjacent the front portion of the dispensing spout 110. Referring to FIGS. 1-3, at the horizontal pouring position (FIG. 1), the spring 120 is in a free position (at rest—no compression) and the baffle 116 is in a completely open position. As the pouring angle is increased (FIG. 2), fluid in the container 900 contacts the flat baffle plate 116 (see arrows). Head pressure from the fluid acts on the hinged baffle plate 116 compressing the spring 120 and partially closing the dispensing passage. When the bottle 900 is full, there is more head pressure, and the baffle plate 116 closes off more of the flow passage to regulate flow. As the bottle 900 empties, there is less fluid and less head pressure, opening the dispensing passage slightly more with fluid flow. Thus, the amount of fluid in the bottle 900, and the spring pressure cooperate to regulate flow and have an inverse relationship of head pressure and dispensing passage throughput to provide a constant flow rate, i.e. the flow rate when the bottle 900 is full pours at almost the same flow rate when the bottle 900 is near empty.

As illustrated in FIGS. 1-2, a timing device 200 may be mounted externally at a rear portion of the cape base 104. An exemplary timing device is illustrated and described in co-pending PCT Application No. PCT/US2018/012311, the entire contents of which are incorporated herein by reference.

A timing device 200 may include a transparent or translucent outer cylinder 202, a flow restrictor 204 received within the outer cylinder and a flowable material, such as a colored fluid 210 received within the outer cylinder. The flow restrictor 204 includes a generally planar, elongate main body portion and an end cap portion. Flow restrictor 204 may be inserted in an open end of the outer cylinder 202 where the end cap portion may seal or close the end of the outer cylinder. The upper portion of the main body of the flow regulator 202 may include an upwardly extending curved wall forming a cavity therebeneath. Positioning of flow restrictor 204 within the outer cylinder 202 may define a timing reservoir and a storage reservoir separated by portions of the flow restrictor 204. The main body divides the timing reservoir in half with a portion of the fluid above the main body and a portion of the fluid below the main body when the cylinder 202 is vertical. Flow restrictor 204 may include a flow channel 206 having a channel opening in fluid communication with, and opening into, the storage reservoir. The flow opening is preferably located on a lower portion of the curved wall so as to prevent flow, i.e. the start of timing, until the bottle 900 is tilted sufficiently to allow for the product to begin flowing from the dispensing spout 110. In this regard the, the resting angle of the timing device 200, and positioning of the channel opening cooperate to coordinate simultaneous flow of the product from the spout 110 with flow of the fluid 210 in the timing device 200. The timing fluid 210 rides up an angled wall portion before entering into the flow channel opening. A channel exit may be positioned opposite the channel opening and in fluid communication with, and opening into, the storage reservoir. A fluid return channel 208 is defined by the flow restrictor 204 adjacent the terminal end of the main body. The return channel 208 has a fluid entrance on the lower surface of the main body and an exit at the upper end of the channel.

In some embodiments of the invention, the cap base 104 may include an extension 112 into which the timing device 200 may be removably seated. The timing device 200 may be advantageously located anywhere on the pour cap 102 so that the timing device 200 is easily visible to a user during operation or use of the dispensing system 100. The constant flow rate provided by the baffle 116 allows the timing device 200 to more precisely measure each pour regardless of how much fluid is in the bottle 900. The result is far more accurate than a free pour with no baffle.

Figure 5A:
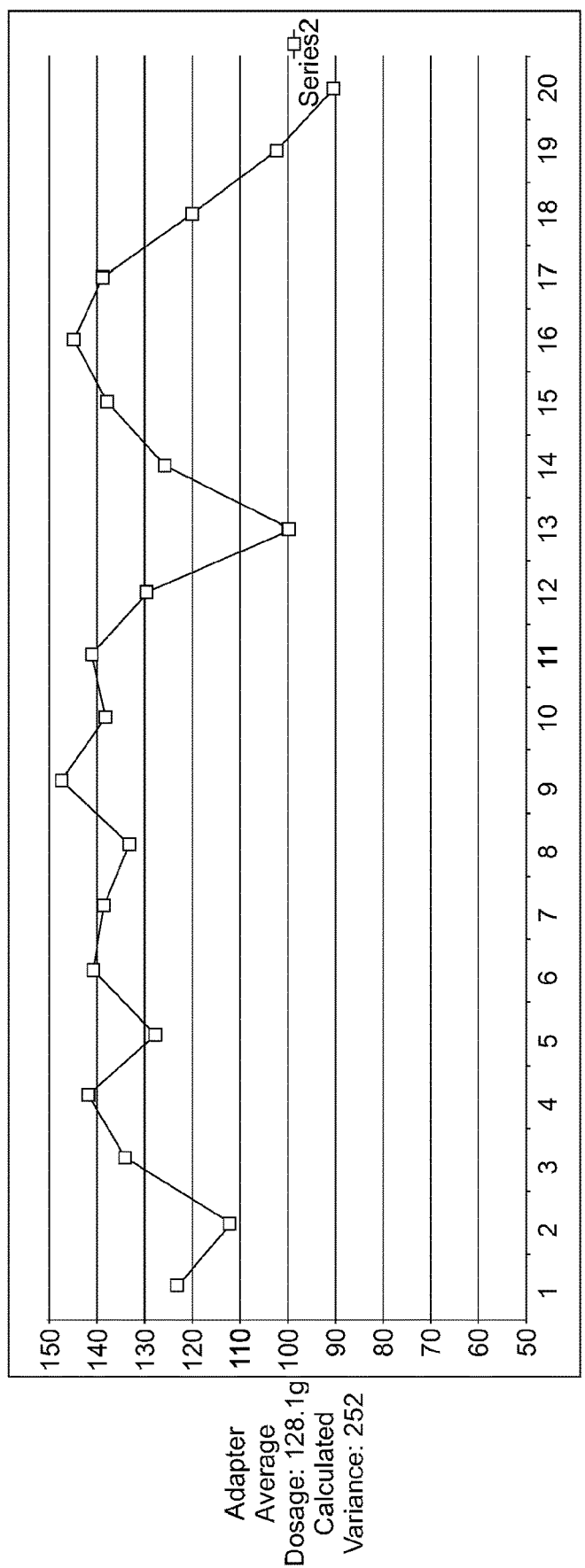
FIG. 5 graphically illustrates a comparison of average dosing with various baffle arrangements.
Figure 5B:
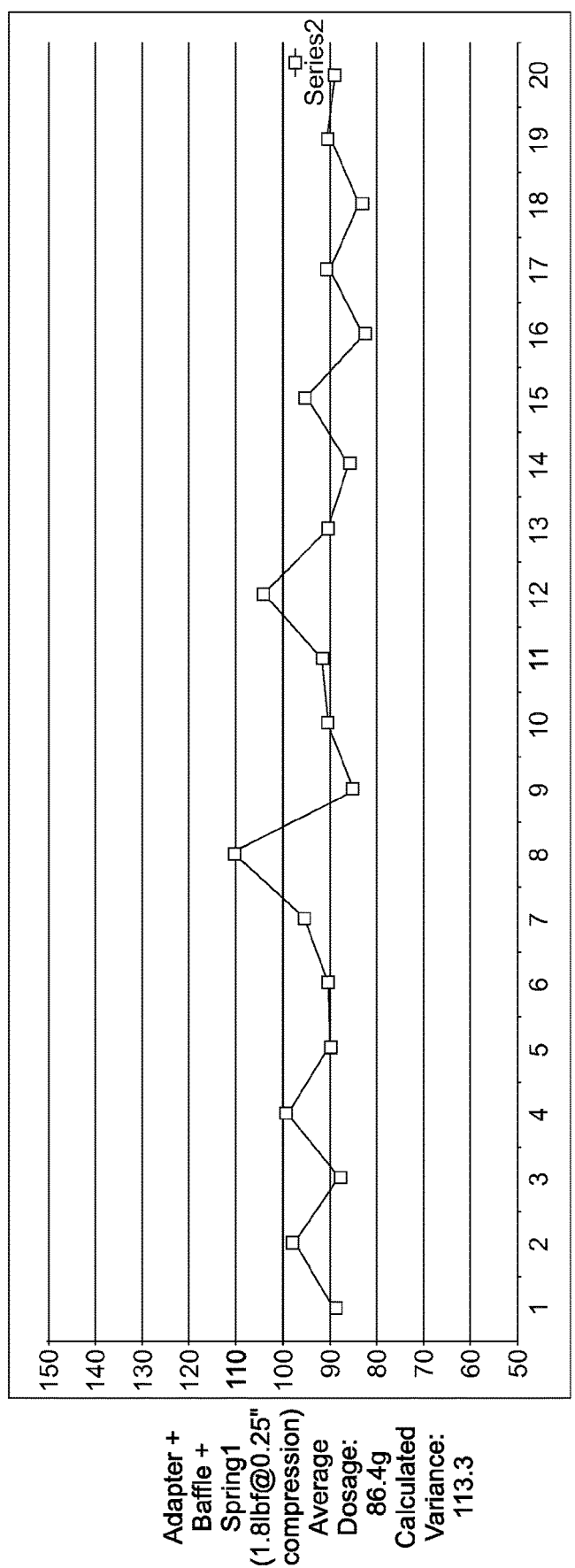
Figure 5C:
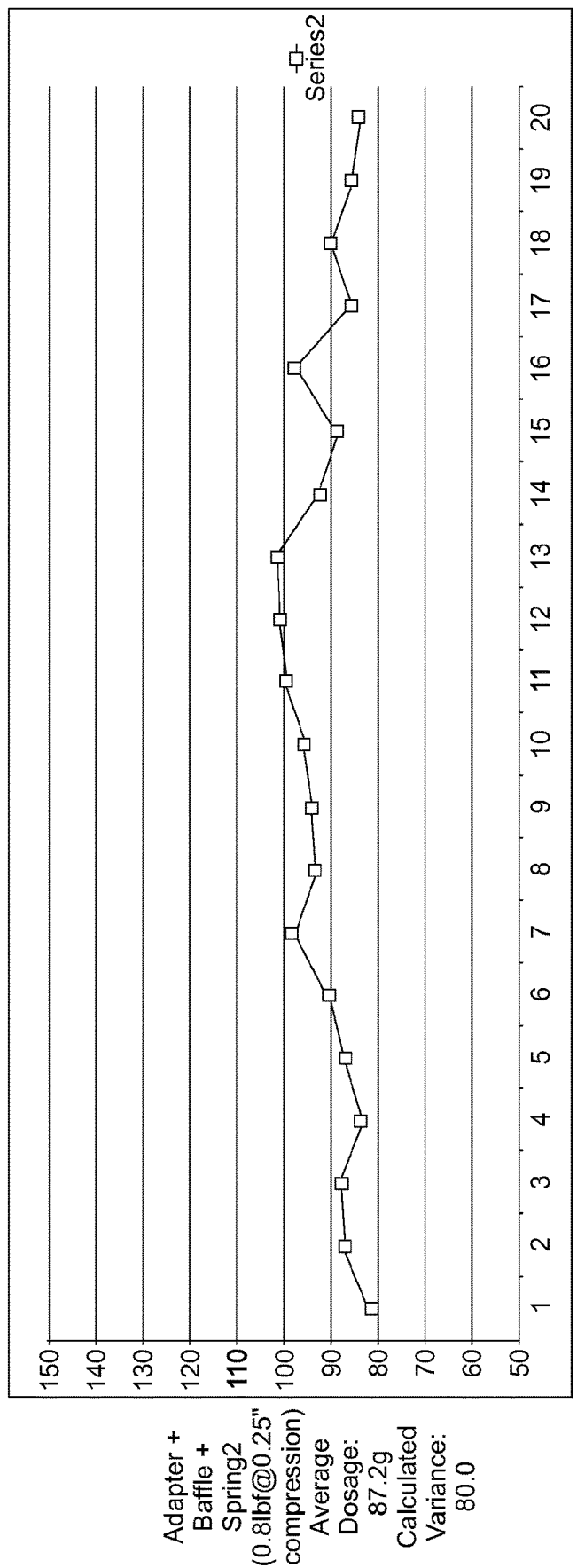

Referring to FIG. 5, the results of various testing are shown in graphical form. In the upper most graph, average dosing of 20 pours was measured over a fixed time with no baffle. The variance was 252 g. In the second graph, average dosing of 20 pours was measured over the same fixed time with the baffle in place and a 1.8 lbf spring at 0.25in compression. The dosing variance was reduced to roughly 113 g. In the bottom graph, average dosing of 20 pours was measured over the same fixed time with the baffle in place and a 0.8 lbf spring at 0.25 in compression. Dosing variance was again reduced to roughly 80 g. Accordingly, it can thus be seen that the baffle certainly reduced the dosing variance over no baffle at all, the testing indicates that varying the spring pressure also provides an ability to modify the dosing variance as well.

Figure 6A:
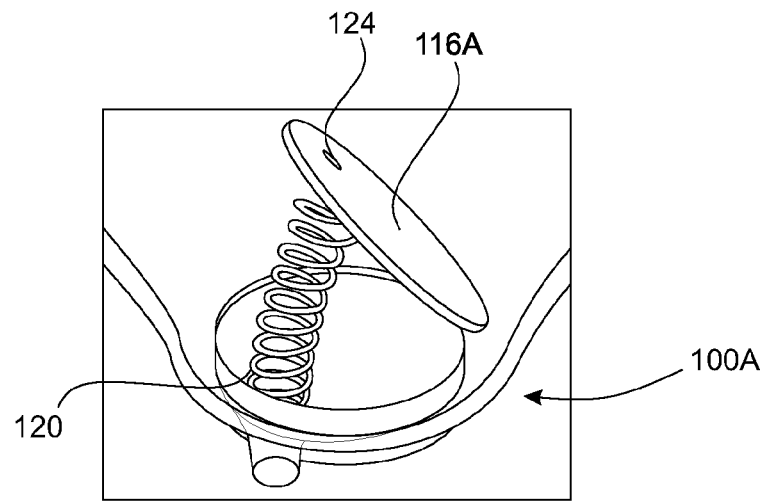
FIGS. 6A-6B illustrate another exemplary embodiment of a baffle plate including a flow aperture.
Figure 6B:
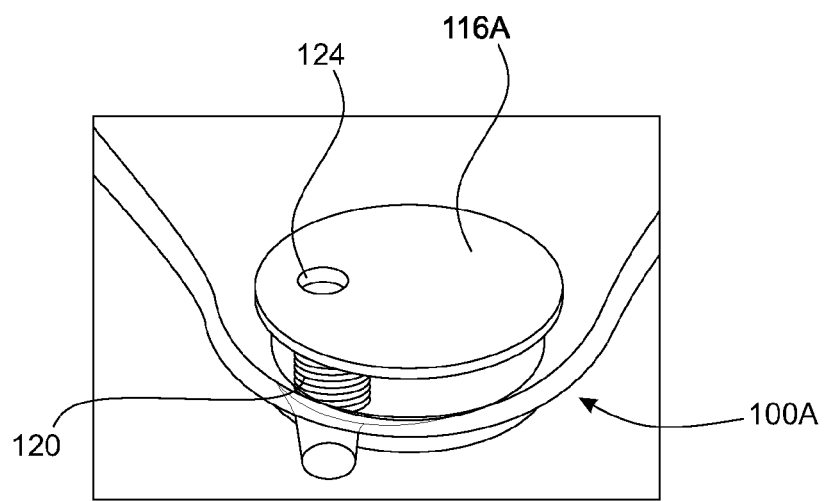

Referring to FIGS. 6A-6B, another exemplary embodiment 100A is illustrated wherein the baffle plate 116 includes a flow aperture 124 adjacent the front portion thereof. The flow aperture 124 can be sized appropriately to increase or decrease the flow through the spout.

Turning to FIGS. 7-10, another exemplary dispensing system 300 according to various embodiments of the invention is illustrated. The dispensing system 300 may include container 900 and a pour cap 302.

According to various embodiments of the invention, the pour cap 302 may include a cap base 304 which may be connected to or mated with the container 900 in various ways. For instance, the cap base 304 may include a skirt 306 having threads, bayonet features, snap features, or other features allowing the pour cap 302 to be connected to the neck 904 of the container 900 having similar features.

In some embodiments, the system 300 may also include a closure lid (not shown) connected to the cap base 304, for example, by a living hinge or other hinge system.

The cap base 304 includes a main deck 308 and a dispensing spout 310 extending upwardly therefrom. A venting tube 312 may be located within the main deck 308 and may further be located adjacent a rear portion of the dispensing spout opening 310. The venting tube 312 extends downwardly from the main deck 308 into the interior of the cap base 304. In other embodiments, the venting tube 312 may be located at other locations depending on the configuration of the cap base 304 and the size and orientation of the dispensing spout 310. A venting orifice 314 is located at the bottom terminal end of the venting tube 312. The venting orifice 314 may be provided by integrally molding the orifice or other means for capping the terminal end of the vent tube 312. The upper end of the venting tube 312 is preferably disposed below the undercut of the spout lip. The length of the venting tube 312 and the size of the venting orifice 314 may be adjusted to determine the venting performance of the dispensing system 300 based on liquids with different viscosities.

A flow regulator comprising gravity ball valve 316 is mounted on the underside of the main deck 308 such that the ball valve 316 may partially block the opening of the dispensing spout 310. A spherical ball 318 is placed into a self-contained cage structure 320 having a portion which is in turn inserted into the bottom end of the dispensing spout 310. The portion of the cage structure 320 seated within the dispensing spout 310 has a tubular flow path 322 with radial flow slots 324 extending longitudinally from the cage 320 to exit end. The cage 320 features flow windows 326 that are large enough to allow fluid to flow from the container 900 into the cage structure 320, but small enough to trap the ball 318 within. The dimeter of ball 318 is larger than the diameter of the flow path 322 but smaller than the outer radial dimension of the radial flow slots 324.

Figure 7:
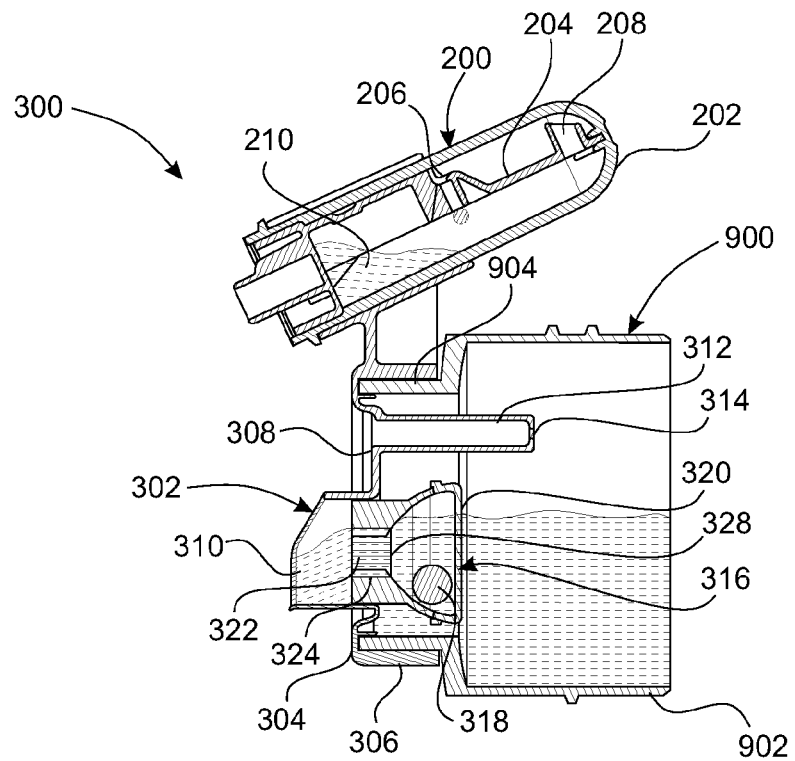
FIG. 7 is a cross-sectional view of another exemplary dispensing system including a ball baffle according to various embodiments of the invention.
Figure 8:
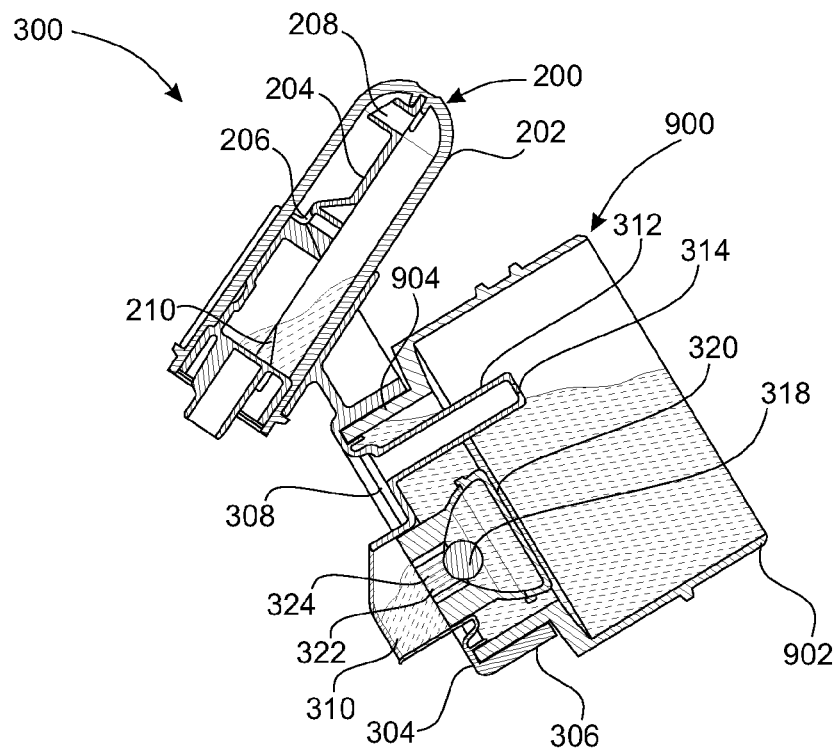
FIG. 8 is another cross-sectional view thereof.

Referring to FIGS. 7-8, at the horizontal pouring position (FIG. 7), the ball 318 sits away from the flow path 322 leaving it completely open and unrestricted. As the pouring angle is increased (FIG. 8), the ball 318 rolls along the curved bottom wall of the cage 320 due to gravity into a seat 328 at the opening of the flow path 322. As noted above, the ball 318 is larger than the flow path 322 and thus blocks the main flow path (See FIG. 9). However, fluid still flows through the radial flow slits 324 and is regulated primarily by the amount of head pressure. In this embodiment though, the size of the radial flow slits 324 is constant.

In this embodiment, the amount of fluid in the bottle 900, and ball valve arrangement 316 cooperate to regulate flow with the intention that the flow rate when the bottle 900 is full pours at almost the same flow rate when the bottle 900 is near empty.

Similar to the earlier exemplary embodiment, timing device 200 may be mounted externally at a rear portion of the cape base 304. The constant flow rate provided by the ball baffle 318 allows the timing device 200 to more precisely measure each pour regardless of how much fluid is in the bottle 900. The result is far more accurate than a free pour with no baffle.

Figure 11A:
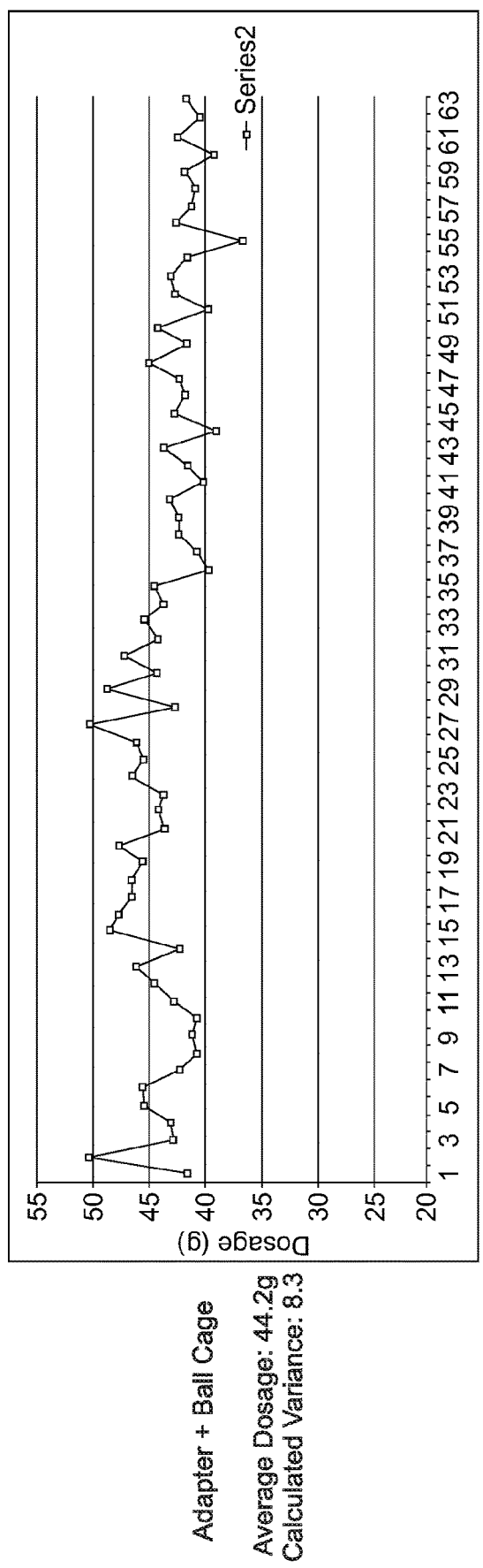
FIG. 11 graphically illustrates a comparison of average dosing with different baffle arrangements.
Figure 11B:
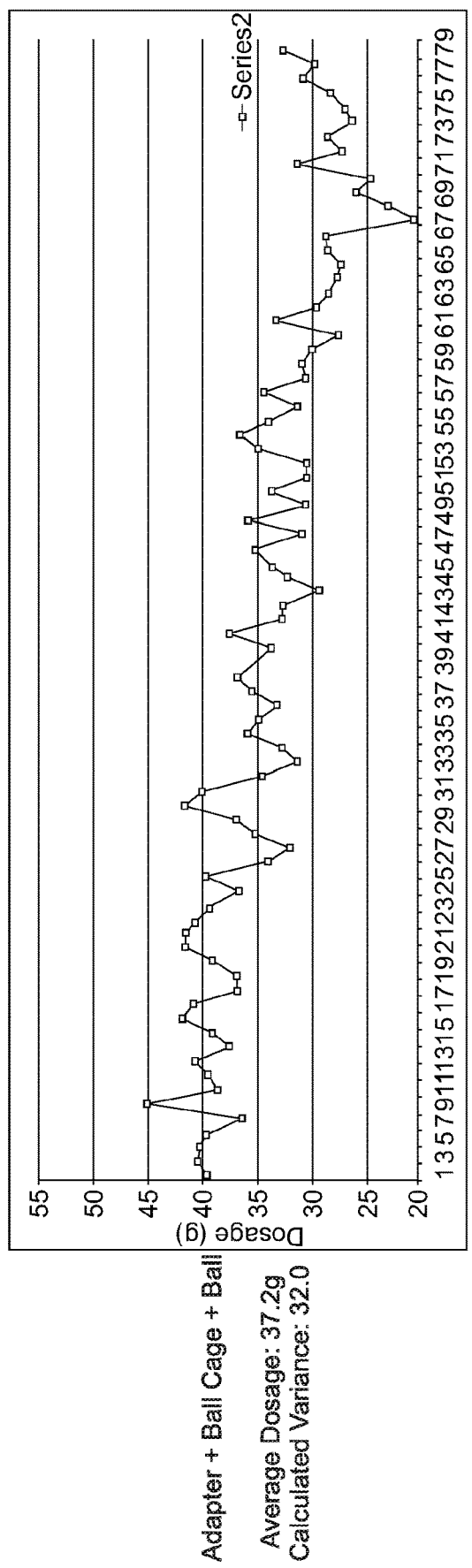

Referring to FIG. 11, the results of various testing are shown in graphical form. In the upper most graph, average dosing of more than 60 pours was measured over a fixed time with the ball cage structure 320 in place, but no spherical ball 318. The dosing was a smaller volume (roughly half of the hinged baffle plate versions). However, the variance in dosing was only 8 g. In the second graph, average dosing of more than 60 pours was measured over the same fixed time with the ball cage 320 and ball 318 in place. The dosing slightly decreased, but the variance increased to 32 g. However, both variances were still below the variance demonstrated in the hinged baffle plate 116 versions. Upon review, it is theorized that the increase in variance may be the result of head pressure alone with a constant size flow passage. The higher head pressure when the bottle 900 is full results in a higher flow volume. The testing completed without the ball 318 indicates that the cage structure 320 by itself may operate to disrupt and regulate flow fairly consistent regardless of bottle volume.

According to various embodiments of the invention, characteristics of the spring 120 and the baffle plate 116, and/or spherical ball size 318 and presence may be altered to change the flow volume exiting the spout 110/310.

While various embodiments of the invention have been described with respect to a fluid contained in the container, it is understood that other embodiments may utilize another flowable material such as powder or granules.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:
1. A dispensing system, comprising:
   a container;
   a pour cap attached to the container, the pour cap including a main deck, a dispensing spout in the main deck, a flow regulator on an underside of the main deck extending across said dispensing spout, a vent tube extending from an underside of the main deck and a vent orifice at a terminal end of the vent tube, and wherein said flow regulator comprises a hinged baffle plate and a spring biasing the baffle plate to a normally open position.

2. The dispensing system of claim 1, wherein said dispensing spout has a flow path and a plurality of radially extending slots along said flow path, said flow regulator comprising a ball valve.

3. The dispensing system of claim 2 wherein said ball valve further comprises a cage structure disposed around said flow path and said dispensing spout, and capturing said ball valve within said cage.

4. The dispensing systems of claim 3 wherein said flow path further includes a ball valve seat, said ball valve being movable into and out of engagement with said seat to regulate flow through said flow path.

5. The dispensing system of claim 1 further comprising a timing device associated with the pour cap.

6. The dispensing system of claim 5, wherein the timing device comprises:
   a transparent or translucent outer cylinder;
   a flowable material contained within the cylinder; and
   a flow restrictor within the outer cylinder.

7. The dispensing system of claim 5, wherein the timing device comprises:
   a transparent or translucent outer cylinder having an interior wall;
   a flow restrictor within the outer cylinder, wherein the flow restrictor and interior wall define a timing reservoir and a storage reservoir;
   a channel between the timing reservoir and the storage reservoir; and
   a fluid contained within the timing device.

8. The dispensing system of claim 7 wherein the fluid comprises a colored fluid.

9. The dispensing system of claim 1 further comprising a timing device associated with the pour cap.

10. The dispensing system of claim 9, wherein the timing device comprises:
    a transparent or translucent outer cylinder;
    a flowable material contained within the cylinder; and
    a flow restrictor within the outer cylinder.

11. The dispensing system of claim 9, wherein the timing device comprises:
    a transparent or translucent outer cylinder having an interior wall;
    a flow restrictor within the outer cylinder, wherein the flow restrictor and interior wall define a timing reservoir and a storage reservoir;
    a channel between the timing reservoir and the storage reservoir; and
    a fluid contained within the timing device.

12. The dispensing system of claim 11 wherein the fluid comprises a colored fluid.

13. The dispensing system of claim 2 further comprising a timing device associated with the pour cap.

14. The dispensing system of claim 13, wherein the timing device comprises:
    a transparent or translucent outer cylinder;
    a flowable material contained within the cylinder; and
    a flow restrictor within the outer cylinder.

15. The dispensing system of claim 13, wherein the timing device comprises:
    a transparent or translucent outer cylinder having an interior wall;
    a flow restrictor within the outer cylinder, wherein the flow restrictor and interior wall define a timing reservoir and a storage reservoir;
    a channel between the timing reservoir and the storage reservoir; and
    a fluid contained within the timing device.

16. The dispensing system of claim 15 wherein the fluid comprises a colored fluid.

\* \* \* \* \*